US012260739B2

(12) United States Patent
S et al.

(10) Patent No.: US 12,260,739 B2
(45) Date of Patent: Mar. 25, 2025

(54) ADAPTABLE SUPERVISION RATE FOR WIRELESS INTRUSION DETECTORS

(71) Applicant: Honeywell International Inc., Charlotte, NC (US)

(72) Inventors: Ruban S, Tamilnadu (IN); Eldhose K. George, Kerala (IN); Balaji R, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 91 days.

(21) Appl. No.: 18/336,669

(22) Filed: Jun. 16, 2023

(65) Prior Publication Data

US 2024/0420562 A1 Dec. 19, 2024

(51) Int. Cl.

*G08B 21/00* (2006.01)
*G08B 13/04* (2006.01)
*G08B 17/10* (2006.01)
*G08B 19/00* (2006.01)
*G08B 25/01* (2006.01)
*G08B 25/14* (2006.01)

(52) U.S. Cl.

CPC ............. *G08B 25/14* (2013.01); *G08B 13/04* (2013.01); *G08B 17/10* (2013.01); *G08B 19/00* (2013.01); *G08B 25/016* (2013.01)

(58) Field of Classification Search

CPC ........ G08B 25/14; G08B 13/04; G08B 17/10; G08B 19/00; G08B 25/016
USPC .......................................................... 340/506
See application file for complete search history.

(56) References Cited

U.S. PATENT DOCUMENTS 11,004,316 B2 5/2021 Krishnamoorthy et al.
11,367,341 B2 6/2022 Rodolico et al.
2006/0119476 A1 6/2006 Hope
2012/0188072 A1* 7/2012 Dawes ................ H04L 12/2825 340/514
2013/0155242 A1 6/2013 Hevia et al.
2015/0254950 A1* 9/2015 Patterson ............... G08B 13/00 340/541
2018/0182235 A1* 6/2018 Lin ...................... G08B 21/182
(Continued)

OTHER PUBLICATIONS

EN 50131 for Wireless Alarm Systems: Grade Explained, 5 pages, Jun. 6, 2023.

(Continued)

*Primary Examiner* — Mark S Rushing
(74) *Attorney, Agent, or Firm* — Seager, Tufte & Wickhem, LLP

(57) ABSTRACT

Supervisory signals from a first wireless security sensor are received at a first supervisory rate that repeatedly confirms that the first wireless security sensor remains operatively coupled to a security system controller. A first security sensor alarm is received from the first wireless security sensor and in response, the first supervisory rate is changed to a second, higher, supervisory rate. Supervisory signals are received from the first wireless security sensor at the second supervisory rate that repeatedly confirms that the first wireless security sensor remains operatively coupled to the security system controller. When a second security sensor alarm is received from the first wireless security sensor within a predetermined period of time after the first security sensor alarm, an alarm condition detection alarm is issued from the security system controller.

15 Claims, 7 Drawing Sheets

(56) References Cited

U.S. PATENT DOCUMENTS

| | | | | |
|---|---|---|---|---|
| 2020/0100115 | A1* | 3/2020 | Skaaksrud | B64D 45/00 |
| 2020/0193803 | A1* | 6/2020 | Rodolico | G08B 13/1663 |
| 2020/0226894 | A1* | 7/2020 | Krishnamoorthy | G08B 3/10 |

OTHER PUBLICATIONS

Fortecho Arts Specifications, 12 pages, 2023. https://fortecho.com/all-products/micro-climate-tag/.
Partial European Search Report, EP Application No. 24178007.1, European Patent Office, Nov. 5, 2024 (14 pages).

* cited by examiner

ADAPTABLE SUPERVISION RATE FOR WIRELESS INTRUSION DETECTORS

TECHNICAL FIELD

The present disclosure relates generally to security systems. More particularly, the present disclosure relates to security system with wireless sensors.

BACKGROUND

A number of security systems employ security sensors that are disposed about a facility that is being protected by the security system. In some cases, individual security sensors may be susceptible to being tampered with in an attempt to break into a facility. If individual security sensors only infrequently check-in with a security panel, it is possible for the security system to not report an alarm condition for an extended period of time, especially when the security system must confirm an alarm condition detected by a security sensor before the security system reports the detected alarm condition. Confirmation of the alarm conditions detected by the security sensors may be desirable to reduce false alarms and thus increase the robustness of the security system. When so provided, if a security sensor is tampered with and goes off-line before a detected alarm condition can be confirmed by the security system, the detected alarm condition may go unreported until, for example, the corresponding security sensor misses its next infrequent check-in time. What would be desirable are security systems that can vary the rate in which the security sensors check-in to help avoid missing detected alarm conditions.

SUMMARY

The present disclosure relates generally to security systems and more particularly to adaptable supervision rates for wireless security sensors within a security system. An example may be found in a method for operating a security system controller. The illustrative method includes receiving supervisory check-in signals from a first wireless security sensor at a first supervisory rate, which when received, repeatedly confirm to the security system controller that the first wireless security sensor remains operatively coupled to the security system controller. A first security sensor alarm is received from the first wireless security sensor indicating an alarm condition detected by the first wireless security sensor. In response to receiving the first security sensor alarm from the first wireless security sensor, the first supervisory rate is changed to a second supervisory rate, wherein the second supervisory rate is a higher rate (e.g. more frequent) than the first supervisory rate. The method includes determining when supervisory signals are not received from the first wireless security sensor at the second supervisory rate before receiving a second security alarm from the first wireless security sensor confirming the alarm condition of the first security sensor alarm, and in response, the security system controller issuing a tamper alarm associated with the first wireless security sensor.

Another example may be found in a method for operating a security system that includes a plurality of security sensors. The illustrative method includes repeatedly confirming at a first supervisory rate that each of the plurality of security sensors are in operation. When a first alarm is received from any of the plurality of security sensors, the first supervisory rate for each of the plurality of security sensors is dynamically adjusted to a second supervisory rate that is higher than the first supervisory rate. The illustrative method includes repeatedly confirming at the second supervisory rate that each of the plurality of security sensors are in operation.

Another example may be found in a method for operating a security system controller. The illustrative method includes receiving supervisory signals from a first wireless security sensor at a supervisory rate assigned to the first wireless security sensor, which when received, repeatedly confirm to the security system controller that the first wireless security sensor remains operatively coupled to the security system controller. The illustrative method includes receiving supervisory signals from a second wireless security sensor at a supervisory rate that is assigned to the second wireless security sensor, which when received, repeatedly confirm to the security system controller that the second wireless security sensor remains operatively coupled to the security system controller. In this example, the supervisory rate that is assigned to the first wireless security sensor is different from the supervisory rate that is assigned to the second wireless security sensor. The illustrative method includes receiving a first security sensor alarm from the first wireless security sensor indicating an alarm condition detected by the first wireless security sensor and receiving a second security sensor alarm from the first wireless security sensor within a predetermined period of time of the first security sensor alarm, the second security sensor alarm confirming the alarm condition. The illustrative method includes issuing an alarm condition detection alarm from the security system controller after receiving the second security sensor alarm from the first wireless security sensor within the predetermined period of time. In some cases, and in response to receiving the first security sensor alarm from the first wireless security sensor, the supervisory rate that is assigned to the first wireless security sensor may be changed to a higher supervisory rate.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
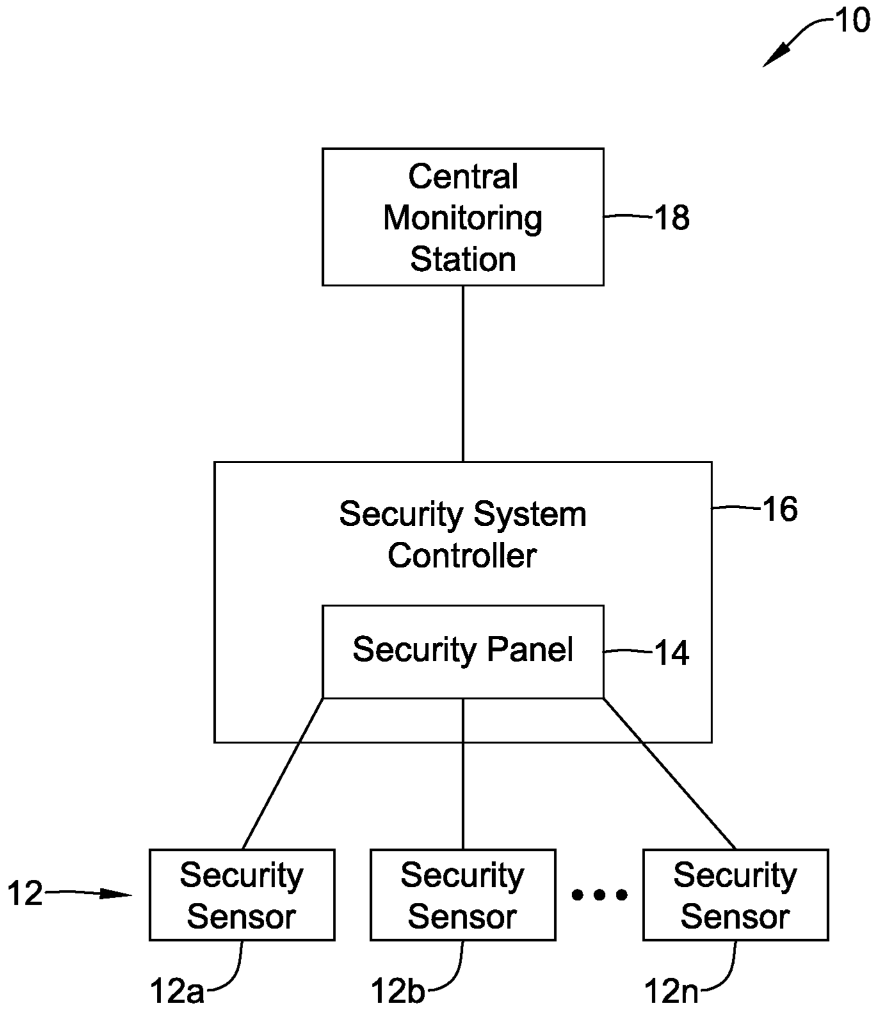
FIG. 1 is a schematic block diagram showing an illustrative security system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10. The illustrative security system 10 may include a number of security sensors 12, individually labeled as 12*a*, 12*b* and through 12*n*. The security system 10 may include tens, hundreds or even thousands of security sensors 12. The security system 10 may include a variety of different types of security sensors 12, such as window open sensors, door open sensors, glass break detectors, motion detectors, fire sensors, smoke sensors, gas sensors and the like. In some instances, each of the security sensors 12 may communicate with a security panel 14. In some instances, at least some of the security sensors 12 may be wireless security sensors that communicate with the security panel 14 over any of a variety of different wireless communication protocols. The wireless security sensors may be battery-powered.

In some instances, the security panel 14 may be part of a security system controller 16. In some instances, the security panel 14 may include the security system controller 16. In some instances, the security panel 14 and the security system controller 16 may be separate. In some instances, at least some features of the security panel 14 and/or the security system controller 16 may be provided within one or more edge controllers while other features of the security panel 14 and/or the security system controller 16 may be provided within one or more remote or cloud-based servers, for example.

In the example shown, the security system controller 16 communicates with a central monitoring station 18. In some instances, the central monitoring station 18 may be configured to monitor for alarms and other alerts from a number of different security systems 10 within a number of different facilities. The central monitoring station 18 may be configured to display a dashboard displaying various alarms and other alerts so that a person is able to quickly see and ascertain what is happening in each of the facilities, for example. In some instances, the security system controller 16 may include the central monitoring station 18.

In some instances, if a first sensor alarm (e.g. motion, tamper, etc.) is received from any of the wireless security sensors, the security system controller may be configured to wait for the wireless security sensor to send a second sensor alarm confirming the first sensor alarm before presenting an alarm notification to the operator of the CMS. This may help reduce the number of false alarms that must be dealt with by the operator of the CMS. However, if an intruder removes and/or destroys a wireless security sensor, such as after the first wireless security sensor issued the first sensor alarm, then the second sensor alarm confirming the first sensor alarm may never be received, and thus an alarm notification to the operator of the CMS may not be provided until a missing sensor alarm is generated at the next supervisory time. When the supervisory rate is for example every 2 hours, then the missing sensor alarm for the first wireless sensor will not be generated for up to 2 hours after the intruder removes and/or destroys the wireless security sensor. In this case, the missing sensor alarm may act as a confirmation of the first sensor alarm, and thus may cause the alarm notification to be presented to the operator of the CMS. To help avoid such a delay, once the first sensor alarm is received from the first wireless security sensor, the supervision time for the first wireless security sensor is switched to a higher supervisory rate (e.g. if the normal supervisory rate is very 2 hours, it will be changed to every 2 minutes once the first sensor alarm is received). After changing the supervisory rate to the higher supervisory rate, the missing sensor alarm will be generated in a relatively shorter time period (e.g. within 2 minutes), which cause a corresponding alarm notification to be presented to the operator of the CMS.

Figure 2A:
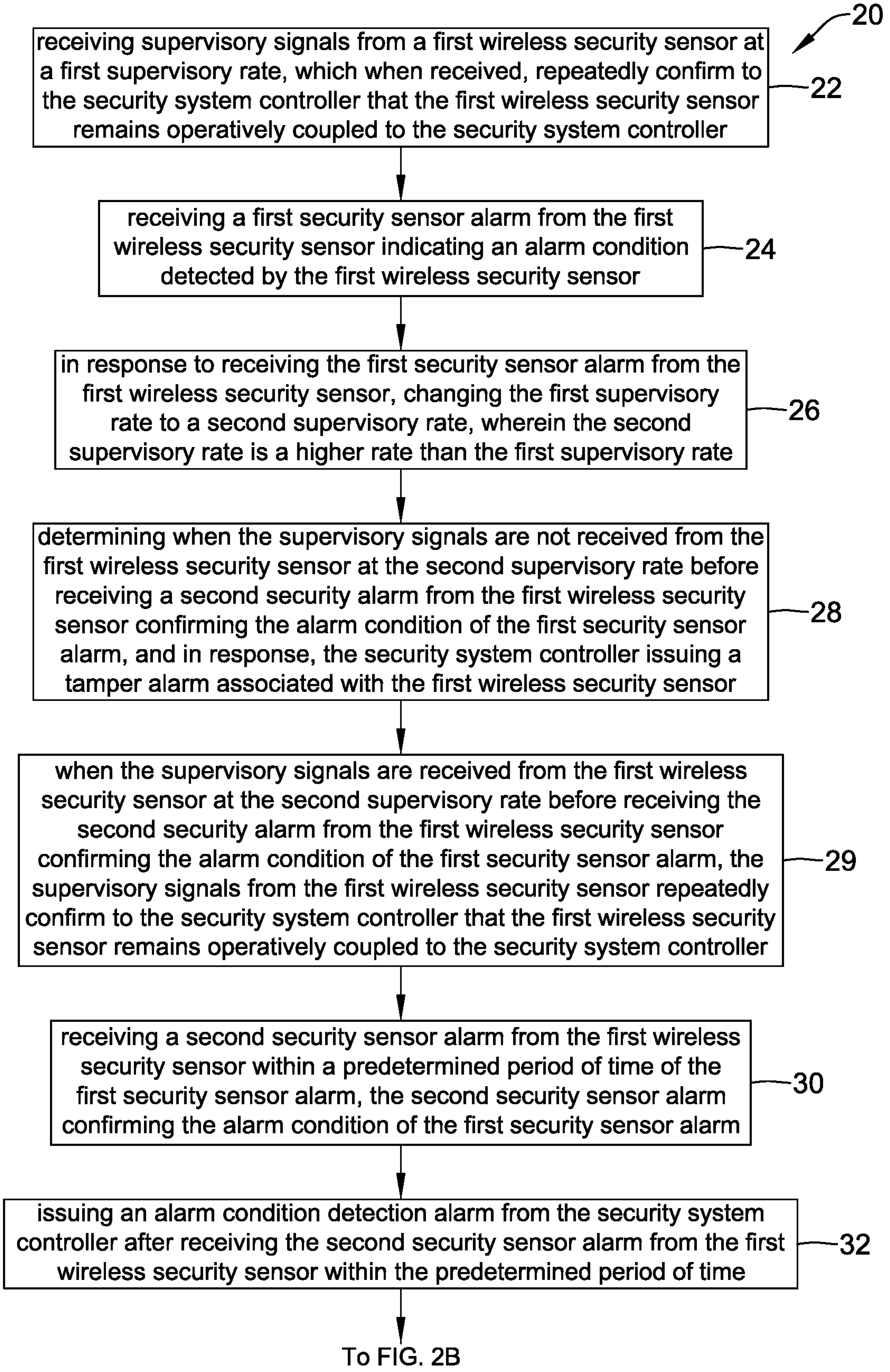
FIGS. 2A through 2C are flow diagrams that together show an illustrative method for operating a security system controller.
Figure 2B:
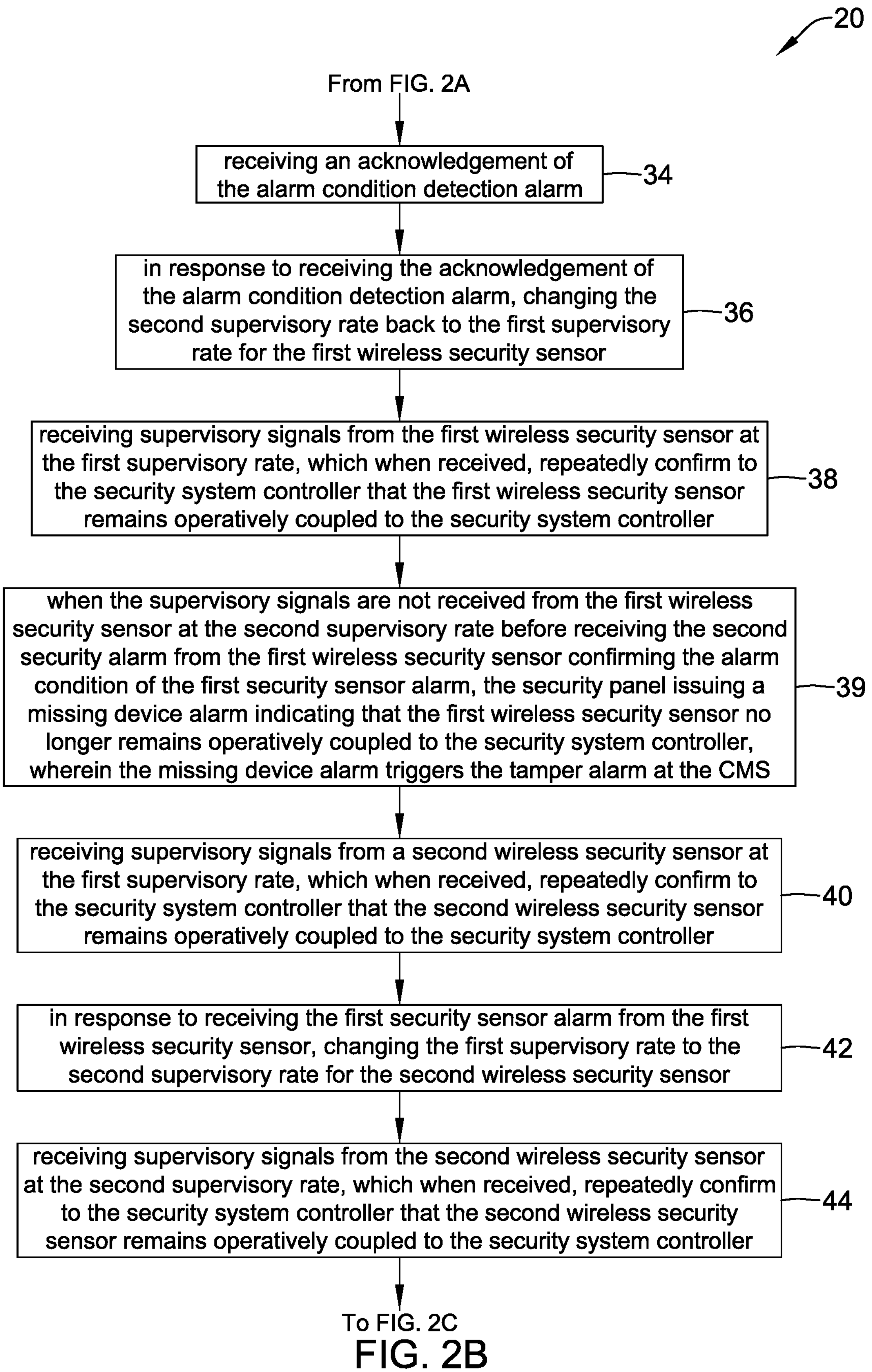
Figure 2C:
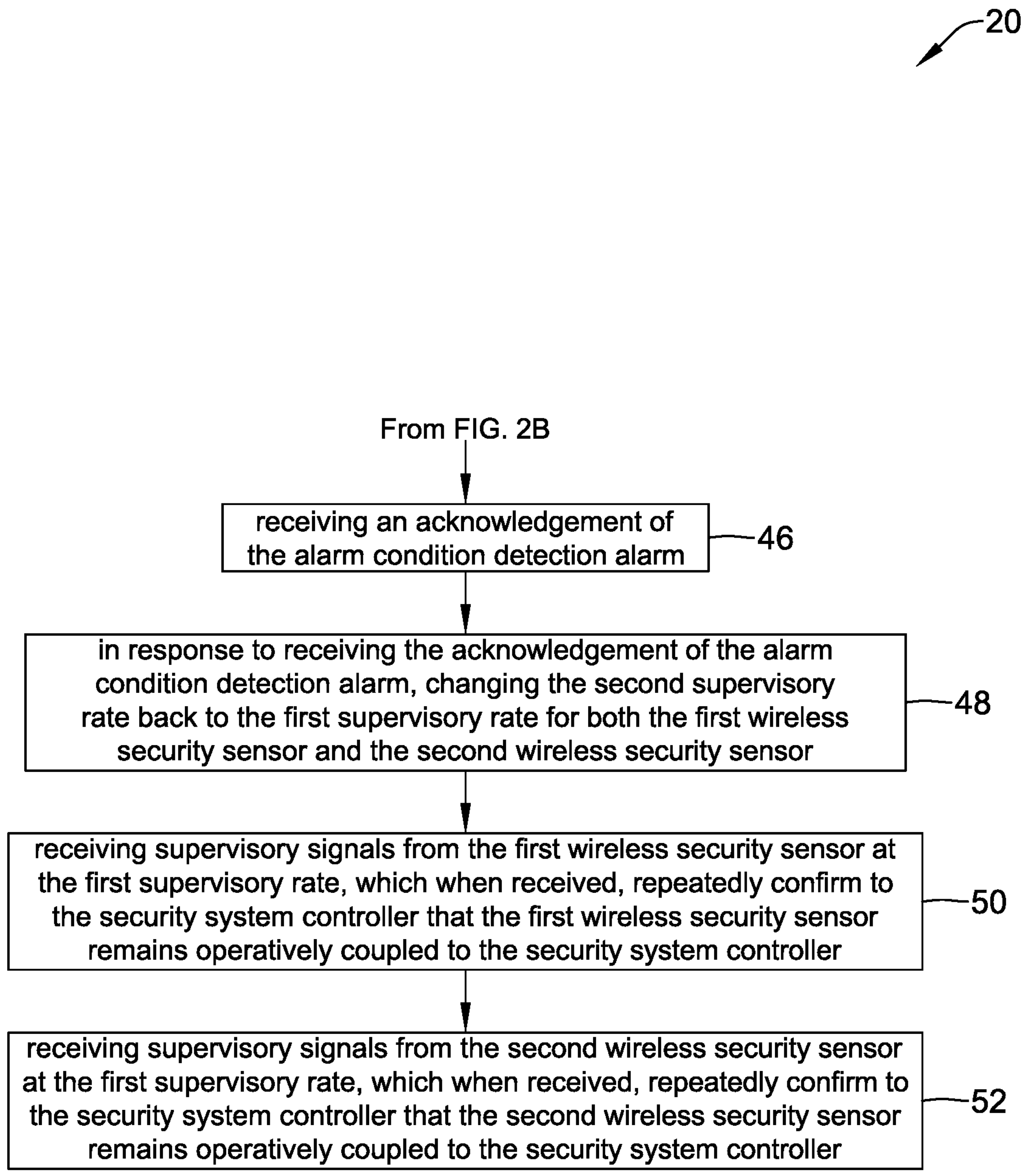

FIGS. 2A through 2C are flow diagrams that together show an illustrative method 20 for operating a security system controller (such as the security system controller 16). The method 20 includes receiving supervisory signals from a first wireless security sensor (such as the security sensor 12*a*) at a first supervisory rate, which when received, repeatedly confirm to the security system controller that the first wireless security sensor remains operatively coupled to the security system controller, as indicated at block 22. The supervisory signals may be considered heart-beat or check-in signals that identify the first wireless security sensor, and in some cases, a current status of the first wireless security sensor. The current status may include, for example, a battery level of a battery powering the first wireless security sensor and/or an operating state of the first wireless security sensor. These are just examples.

The first supervisory rate may be set to reduce the power draw on the battery of the first wireless security sensor by having appropriately infrequent supervisory check-in wireless transmissions from the first wireless sensor. In some cases, the first supervisory rate may depend on the security grade of the security system. For example, according to one standard (EN50131-1 section 8.8.4.1 Periodic communication), for Grade 1 security panels, the maximum permitted intervals between periodic communication signals or message is 240 minutes, for Grade 2, it is 120 minutes, for Grade 3, it is 100 seconds and for Grade 4, it is 10 seconds. Grade 1 intruder alarm systems would only be of interest in domestic properties (without an insurance requirement for an alarm system). Grade 2 intruder alarm systems would be most domestic properties and low-risk commercial (e.g. florists). Grade 3 intruder alarm systems would be for high-risk domestics and most commercial properties (e.g. Newsagent with cigarette sales). Grade 4 intruder alarm systems would be for extremely high-risk domestic and higher risk commercial properties (e.g. bullion stores). These are just examples.

Returning to FIG. 2A, a first security sensor alarm is received from the first wireless security sensor indicating an alarm condition detected by the first wireless security sensor, as indicated at block 24. In response to receiving the first security sensor alarm from the first wireless security sensor, the first supervisory rate is changed to a second supervisory rate, wherein the second supervisory rate is a higher rate (more frequent) than the first supervisory rate, as indicated at block 26. The method 20 includes determining when the supervisory signals are not received from the first wireless security sensor at the second supervisory rate before receiving a second security alarm from the first wireless security sensor confirming the alarm condition of the first security sensor alarm, and in response, the security system controller issues a tamper alarm associated with the first wireless security sensor, as indicated at block 28.

When the supervisory signals are received from the first wireless security sensor at the second supervisory rate before receiving the second security alarm from the first wireless security sensor confirming the alarm condition of the first security sensor alarm, the supervisory signals from the first wireless security sensor repeatedly confirm to the security system controller that the first wireless security sensor remains operatively coupled to the security system controller, as indicated at block 29. In this example, a second security sensor alarm is received from the first wireless security sensor within a predetermined period of time of the first security sensor alarm, which confirms the alarm condition of the first security sensor alarm, as indicated at block 30. The predetermined time may be configurable, for example. An alarm condition detection alarm is issued from the security system controller after receiving the second (i.e. confirming) security sensor alarm from the first wireless security sensor within the predetermined period of time, as indicated at block 32.

Continuing on FIG. 2B, in some instances, the method 20 may further include receiving an acknowledgement of the alarm condition detection alarm, as indicated at block 34. In response to receiving the acknowledgement of the alarm condition detection alarm, the second supervisory rate is changed back to the first supervisory rate for the first wireless security sensor, as indicated at block 36. Thereafter, supervisory signals are received from the first wireless security sensor at the first supervisory rate, which when received, repeatedly confirm to the security system controller that the first wireless security sensor remains operatively coupled to the security system controller, as indicated at block 38. In some instances, acknowledgement of the alarm condition detection alarm is received from a user via a user interface of a central monitoring station (CMS) (such as the central monitoring station 18). In some instances, the security system controller includes a security panel that is operatively coupled between the first wireless security sensor and the CMS.

In some instances, when the supervisory signals from the first wireless security sensor are not received at the first supervisory rate, a missing device alarm may be issued by the security system controller indicating that the first wireless security sensor no longer remains operatively coupled to the security system controller. In some instances, when the supervisory signals from the first wireless security sensor are not received at the second supervisory rate, the missing device alarm may be issued indicating that the first wireless security sensor no longer remains operatively coupled to the security system controller. In some instances, when the supervisory signals are not received from the first wireless security sensor at the second supervisory rate before receiving the second security alarm from the first wireless security sensor confirming the alarm condition of the first security sensor alarm, the security panel issues a missing device alarm indicating that the first wireless security sensor no longer remains operatively coupled to the security system controller, wherein the missing device alarm triggers the tamper alarm at the CMS, as indicated at block 39.

In some instances, the method 20 may further include receiving supervisory signals from a second wireless security sensor (such as the security sensor 12*b*) at the first supervisory rate, which when received, repeatedly confirm to the security system controller that the second wireless security sensor remains operatively coupled to the security system controller, as indicated at block 40. In response to receiving the first security sensor alarm from the first wireless security sensor, the first supervisory rate may be changed to the second supervisory rate for the second wireless security sensor (e.g. in addition to the first wireless security sensor), as indicated at block 42. Thereafter, supervisory signals may be received from the second wireless security sensor at the second supervisory rate, which when received, repeatedly confirm to the security system controller that the second wireless security sensor remains operatively coupled to the security system controller, as indicated at block 44.

Continuing on FIG. 2C, the method 20 may further include receiving an acknowledgement of the alarm condition detection alarm, as indicated at block 46. In response to receiving the acknowledgement of the alarm condition detection alarm, the second supervisory rate may be changed back to the first supervisory rate for both the first wireless security sensor and the second wireless security sensor, as indicated at block 48. Thereafter, supervisory signals may be received from the first wireless security sensor at the first supervisory rate, which when received, repeatedly confirm to the security system controller that the first wireless security sensor remains operatively coupled to the security system controller, as indicated at block 50. Also, supervisory signals may be received from the second wireless security sensor at the first supervisory rate, which when received, repeatedly confirm to the security system controller that the second wireless security sensor remains operatively coupled to the security system controller, as indicated at block 52.

Figure 3:
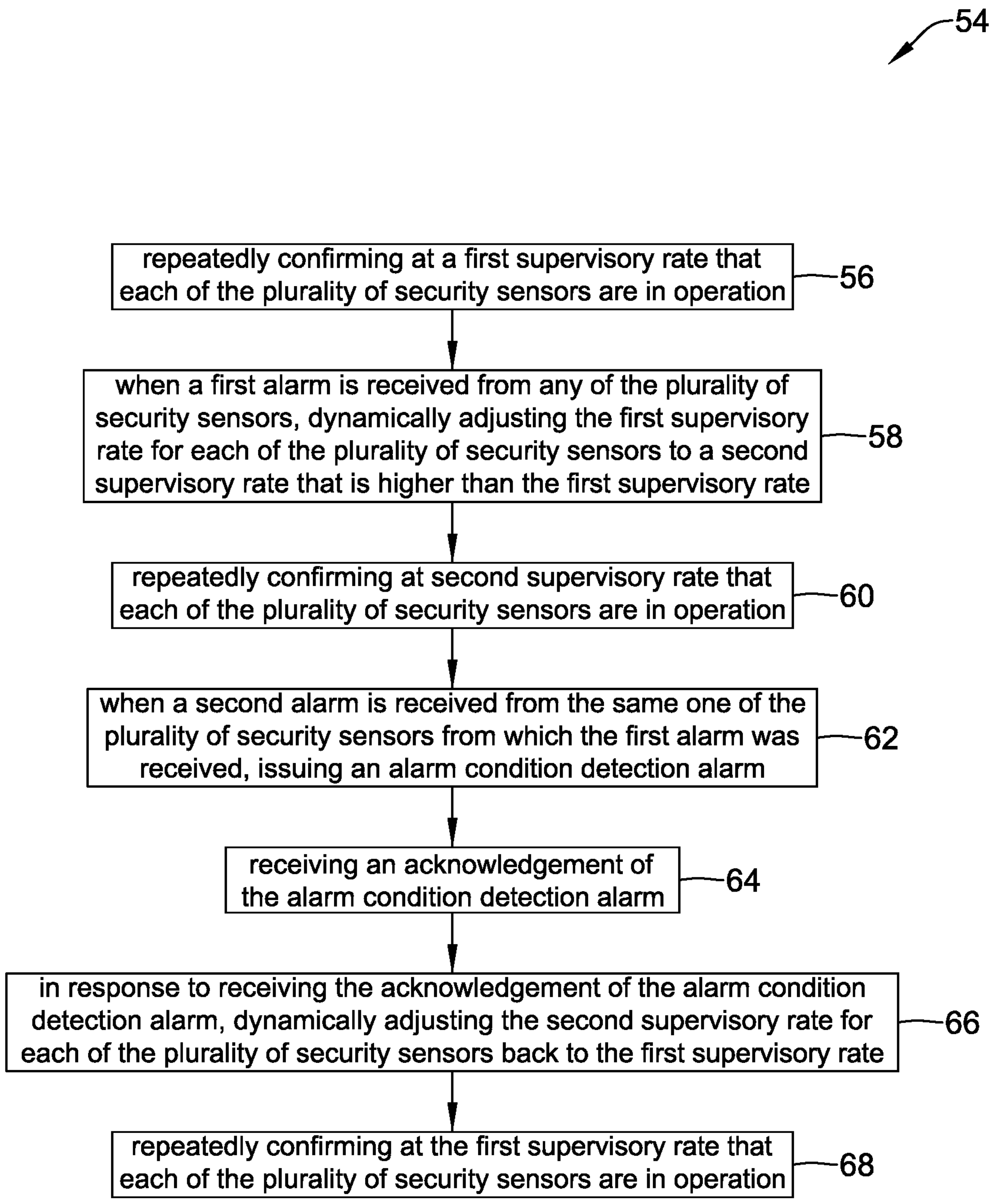
FIG. 3 is a flow diagram showing an illustrative method for operating a security system that includes a plurality of security sensors.

FIG. 3 is a flow diagram showing an illustrative method 54 for operating a security system (such as the security system 10) that includes a plurality of security sensors (such as the security sensors 12). The illustrative method 54 includes repeatedly confirming at a first supervisory rate that each of the plurality of security sensors are in operation, as indicated at block 56. When a first alarm is received from any of the plurality of security sensors, the first supervisory rate is dynamically adjusted for each of the plurality of security sensors to a second supervisory rate that is higher (more frequent) than the first supervisory rate, as indicated at block 58. The illustrative method 54 includes repeatedly confirming at the second supervisory rate that each of the plurality of security sensors are in operation, as indicated at block 60.

In some instances, when a second alarm is received from the same one of the plurality of security sensors from which the first alarm was received, an alarm condition detection alarm is issued by the security system, as indicated at block 62. In some instances, the method 54 may further include receiving an acknowledgement of the alarm condition detection alarm, as indicated at block 64. In response to receiving the acknowledgement of the alarm condition detection alarm, the second supervisory rate may be dynamically adjusted for each of the plurality of security sensors back to the first supervisory rate, as indicated at block 66. The method 54 may include repeatedly confirming at the first supervisory rate that each of the plurality of security sensors are in operation, as indicated at block 68. When one or more of the plurality of security sensors are not confirmed to be in operation, a missing device alarm may be issued.

Figure 4A:
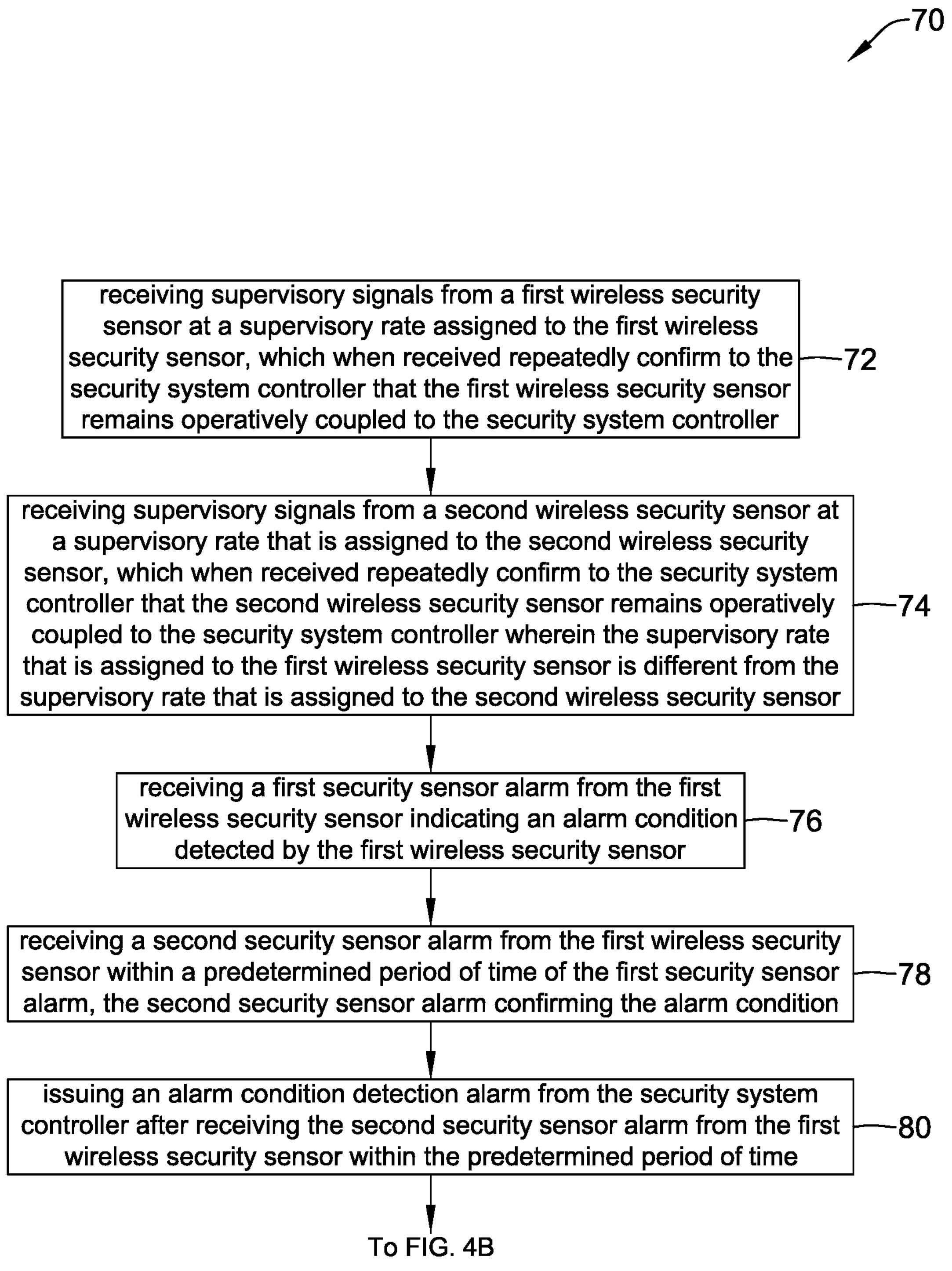
FIGS. 4A and 4B are flow diagrams that together show an illustrative method for operating a security system controller.
Figure 4B:
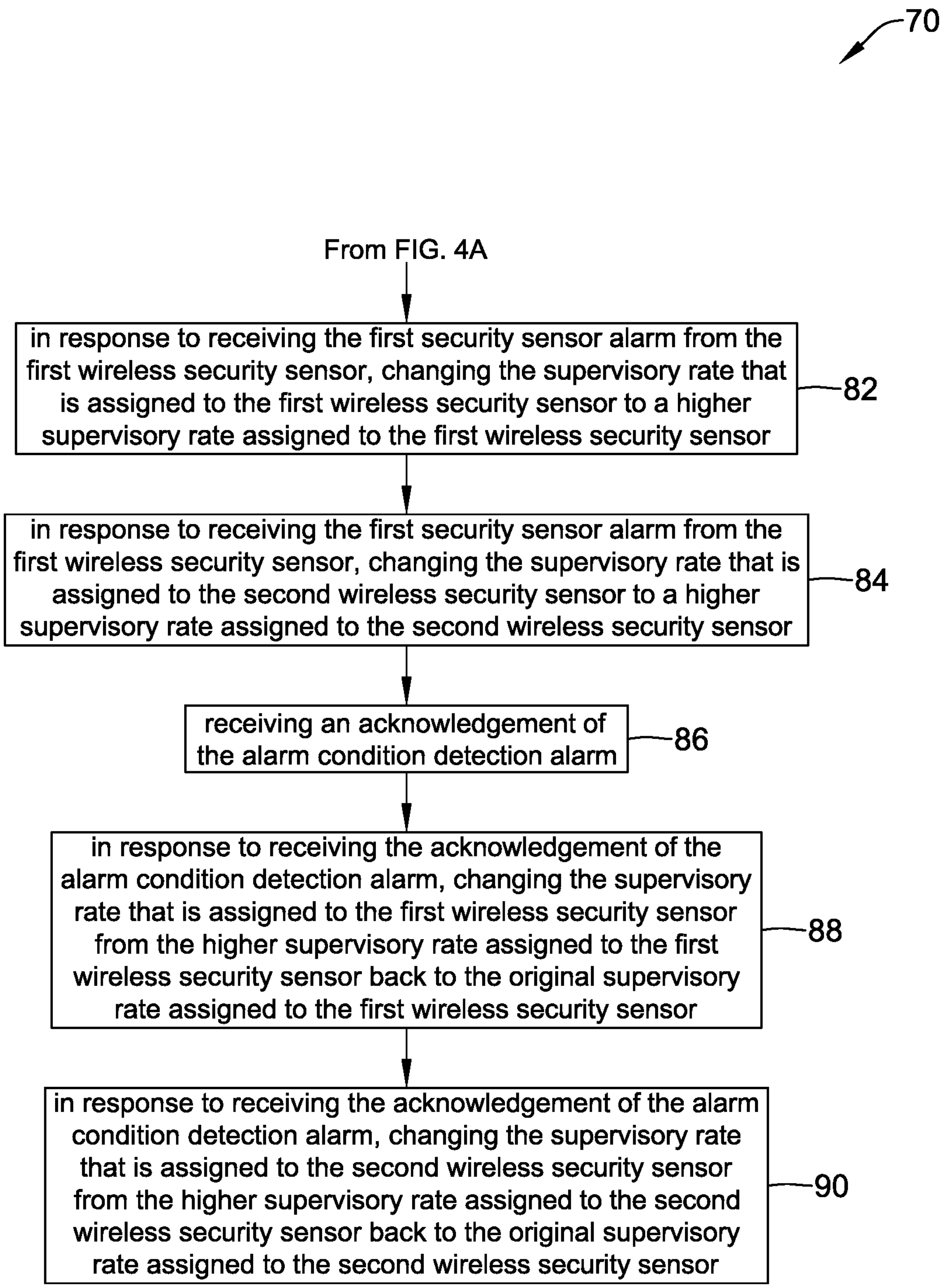

FIGS. 4A and 4B are flow diagrams that together show an illustrative method 70 for operating a security system controller (such as the security system controller 16). The illustrative method 70 includes receiving supervisory signals from a first wireless security sensor (such as the security sensor 12*a*) at a supervisory rate assigned to the first wireless security sensor, which when received, repeatedly confirm to the security system controller that the first wireless security sensor remains operatively coupled to the security system controller, as indicated at block 72. Supervisory signals are received from a second wireless security sensor at a supervisory rate that is assigned to the second wireless security sensor, which when received, repeatedly confirm to the security system controller that the second wireless security sensor remains operatively coupled to the security system controller, wherein the supervisory rate that is assigned to the first wireless security sensor is different from the supervisory rate that is assigned to the second wireless security sensor, as indicated at block 74.

In some instances, security sensors that are located within a periphery of a facility may be more likely to be tampered with by an intruder attempting to enter the facility. Since periphery sensors are more likely to be tampered with, these security sensors may have a supervisory rate that is more frequent than those security sensors that are less likely to be tampered with during an attempted intrusion. Security sensors within an interior of the facility may have a supervisory rate that is less frequent. As an example, security sensors within the periphery of a facility may have a supervisory rate of 5 minutes while security sensors within an interior of a facility may have a supervisory rate of 2 hours. Other supervisory rates are contemplated. It is contemplated that the supervisory rates for each of the sensors may be user configurable, and each sensor may be assigned a desired supervisory rate depending on the type of sensor, the location of the sensor and/or any other characteristic of the sensor. In some cases, the supervisory rates for each sensor may be changes in accordance with a schedule that is programmable by a user. For example, one or more of the sensors may be scheduled to have a more frequent supervisory rate during the night time or when the building is closed, and may be scheduled to have a less frequency supervisory rate during the day time or when the building is open for business. These are just examples.

Continuing with FIG. 4A, a first security sensor alarm is received from the first wireless security sensor indicating an alarm condition detected by the first wireless security sensor, as indicated at block 76. A second security sensor alarm is received from the first wireless security sensor within a predetermined period of time of the first security sensor alarm, the second security sensor alarm confirming the alarm condition, as indicated at block 78. An alarm condition detection alarm is issued from the security system controller after receiving the second (confirming) security sensor alarm from the first wireless security sensor within the predetermined period of time, as indicated at block 80.

Referring to FIG. 4B, the illustrative method 70 may include, in response to receiving the first security sensor alarm from the first wireless security sensor, changing the supervisory rate that is assigned to the first wireless security sensor to a higher supervisory rate (more frequent) assigned to the first wireless security sensor, as indicated at block 82. The method 70 may include, in response to receiving the first security sensor alarm from the first wireless security sensor, changing the supervisory rate that is assigned to the second wireless security sensor to a higher supervisory rate assigned to the second wireless security sensor, as indicated at block 84.

In some instances, the method 70 may include receiving an acknowledgement of the alarm condition detection alarm, as indicated at block 86. In response to receiving the acknowledgement of the alarm condition detection alarm, the supervisory rate that is assigned to the first wireless security sensor may be changed from the higher supervisory rate assigned to the first wireless security sensor back to the original supervisory rate assigned to the first wireless security sensor, as indicated at block 88. In some instances, in response to receiving the acknowledgement of the alarm condition detection alarm, the supervisory rate that is assigned to the second wireless security sensor may be changed from the higher supervisory rate assigned to the second wireless security sensor back to the original supervisory rate assigned to the second wireless security sensor.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for operating a security system controller, the method comprising:

receiving supervisory signals from a first wireless security sensor at a first supervisory rate, which when received, repeatedly confirm to the security system controller that the first wireless security sensor remains operatively coupled to the security system controller;

receiving a first security sensor alarm from the first wireless security sensor indicating an alarm condition detected by the first wireless security sensor;

in response to receiving the first security sensor alarm from the first wireless security sensor, changing the first supervisory rate to a second supervisory rate, wherein the second supervisory rate is a higher rate than the first supervisory rate;

determining when the supervisory signals are not received from the first wireless security sensor at the second supervisory rate, and in response, the security system controller issuing an alarm associated with the first wireless security sensor;

in response to receiving an acknowledgement of the alarm condition, changing the second supervisory rate back to the first supervisory rate for the first wireless security sensor; and receiving supervisory signals from the first wireless security sensor at the first supervisory rate, which when received, repeatedly confirm to the security system controller that the first wireless security sensor remains operatively coupled to the security system controller.

2. The method of claim 1, comprising:

when the supervisory signals are received from the first wireless security sensor at the second supervisory rate, the supervisory signals from the first wireless security sensor repeatedly confirm to the security system controller that the first wireless security sensor remains operatively coupled to the security system controller; and when a second security sensor alarm from the first wireless security sensor is received within a predetermined period of time of the first security sensor alarm, the second security sensor alarm confirming the alarm condition of the first security sensor alarm and in response, the security system controller sending an alarm condition detection alarm to a Central Monitoring Station (CMS), and when acknowledged at the CMS, receiving the acknowledgement of the alarm condition from the CMS.

3. The method of claim 2, wherein the security system controller includes a security panel that is operatively coupled between the first wireless security sensor and the CMS.

4. The method of claim 3, wherein when the supervisory signals are not received from the first wireless security sensor at the second supervisory rate, the security panel issuing a missing device alarm indicating that the first wireless security sensor no longer remains operatively coupled to the security system controller, wherein the missing device alarm triggers a tamper alarm at the CMS.

5. The method of claim 1, comprising:

receiving supervisory signals from a second wireless security sensor at the first supervisory rate, which when received, repeatedly confirm to the security system controller that the second wireless security sensor remains operatively coupled to the security system controller;

in response to receiving the first security sensor alarm from the first wireless security sensor, changing the first supervisory rate to the second supervisory rate for the second wireless security sensor; and receiving supervisory signals from the second wireless security sensor at the second supervisory rate, which when received, repeatedly confirm to the security system controller that the second wireless security sensor remains operatively coupled to the security system controller.

6. The method of claim 5, comprising:

in response to receiving the acknowledgement of the alarm condition, changing the second supervisory rate back to the first supervisory rate for both the first wireless security sensor and the second wireless security sensor;

receiving supervisory signals from the first wireless security sensor at the first supervisory rate, which when received, repeatedly confirm to the security system controller that the first wireless security sensor remains operatively coupled to the security system controller; and receiving supervisory signals from the second wireless security sensor at the first supervisory rate, which when received, repeatedly confirm to the security system controller that the second wireless security sensor remains operatively coupled to the security system controller.

7. The method of claim 1, wherein the first wireless security sensor comprises one or more of a motion sensor, a glass break sensor, a fire sensor, a smoke sensor and a gas sensor.

8. The method of claim 1, wherein the first wireless security sensor is battery powered.

9. The method of claim 1, wherein the security system controller comprises one of:

a security panel;

a central monitoring station; and a security panel operatively coupled to a central monitoring station.

10. A method for operating a security system that includes a plurality of security sensors, the method comprising:

repeatedly confirming at a first supervisory rate that each of the plurality of security sensors are in operation;

when a first alarm indicative of a corresponding alarm condition is received from any of the plurality of security sensors, dynamically adjusting the first supervisory rate for each of the plurality of security sensors to a second supervisory rate that is higher than the first supervisory rate;

repeatedly confirming at the second supervisory rate that each of the plurality of security sensors are in operation;

in response to receiving an acknowledgement of the corresponding alarm condition, dynamically adjusting the second supervisory rate for each of the plurality of security sensors back to the first supervisory rate; and repeatedly confirming at the first supervisory rate that each of the plurality of security sensors are in operation.

11. The method of claim 10, wherein when a second alarm indicative of the same corresponding alarm condition is received from the same one of the plurality of security sensors from which the first alarm was received within a predetermined time of the first alarm, sending an alarm condition detection alarm to a Central Monitoring Station (CMS), and when acknowledged at the CMS, receiving the acknowledgement of the corresponding alarm condition from the CMS.

12. The method of claim 10, wherein when one or more of the plurality of security sensors are not confirmed to be in operation, issuing a missing device alarm.

13. A method for operating a security system controller, the method comprising:

receiving supervisory signals from a first wireless security sensor at a supervisory rate assigned to the first wireless security sensor, which when received, repeatedly confirm to the security system controller that the first wireless security sensor remains operatively coupled to the security system controller;

receiving supervisory signals from a second wireless security sensor at a supervisory rate that is assigned to the second wireless security sensor, which when received, repeatedly confirm to the security system controller that the second wireless security sensor remains operatively coupled to the security system controller;

wherein the supervisory rate that is assigned to the first wireless security sensor is different from the supervisory rate that is assigned to the second wireless security sensor;

receiving a first security sensor alarm from the first wireless security sensor indicating an alarm condition detected by the first wireless security sensor;

in response to receiving the first security sensor alarm from the first wireless security sensor, changing the supervisory rate that is assigned to the first wireless security sensor to a higher supervisory rate assigned to the first wireless security sensor;

receiving a second security sensor alarm from the first wireless security sensor within a predetermined period of time of the first security sensor alarm, the second security sensor alarm confirming the alarm condition;

issuing an alarm condition detection alarm from the security system controller after receiving the second security sensor alarm from the first wireless security sensor within the predetermined period of time;

receiving an acknowledgement of the alarm condition detection alarm; and in response to receiving the acknowledgement of the alarm condition detection alarm, changing the supervisory rate that is assigned to the first wireless security sensor from the higher supervisory rate assigned to the first wireless security sensor back to the original supervisory rate assigned to the first wireless security sensor.

14. The method of claim 13 comprising:

in response to receiving the first security sensor alarm from the first wireless security sensor, changing the supervisory rate that is assigned to the second wireless security sensor to a higher supervisory rate assigned to the second wireless security sensor.

15. The method of claim 14, comprising:

in response to receiving the acknowledgement of the alarm condition detection alarm, changing the supervisory rate that is assigned to the second wireless security sensor from the higher supervisory rate assigned to the second wireless security sensor back to the original supervisory rate assigned to the second wireless security sensor.

* * * * *